United States Patent [19]

Knoche et al.

[11] 4,024,230

[45] May 17, 1977

[54] PRODUCING HYDROGEN AND OXYGEN BY DECOMPOSITION OF WATER VIA THE THERMOCHEMICAL IRON-CHLORINE SYSTEM

[76] Inventors: Karl-Friedrich Knoche, Kersten Pavillon Lousberg; Helmut Cremer, Boxgraben 79; Gerhard Steinborn, Roermonder Str. 309, all of 51 Aachen, Germany

[22] Filed: Sept. 12, 1975

[21] Appl. No.: 613,000

[30] Foreign Application Priority Data

Sept. 14, 1974 Germany .......................... 2443993
Sept. 14, 1974 Germany .......................... 2444061

[52] U.S. Cl. .............. 423/579; 423/658; 423/493
[51] Int. Cl.² ...................... C01B 13/00; C01B 1/08
[58] Field of Search .......... 423/481, 486, 493, 579, 423/632, 633, 657, 658, 149; 75/.5 BA

[56] References Cited

UNITED STATES PATENTS

| | | | |
|---|---|---|---|
| 1,874,225 | 8/1932 | Barstow et al. ..................... | 423/486 |
| 3,443,991 | 5/1969 | Kremm .............................. | 423/481 |
| 3,842,164 | 10/1974 | Wentorf ............................ | 423/579 |
| 3,939,257 | 2/1976 | Pangborn et al. ................. | 423/658 |

FOREIGN PATENTS OR APPLICATIONS 2,155,361  5/1973  Germany .......................... 423/658

*Primary Examiner*—O. R. Vertiz
*Assistant Examiner*—Brian E. Hearn
*Attorney, Agent, or Firm*—Seidel, Gonda & Goldhammer

[57] ABSTRACT

Decomposition of water to hydrogen and oxygen with the aid of a thermochemical cyclic process based upon the iron/chlorine system by reduction of $FeCl_2$ in the presence of $H_2$ to Fe, oxidation of the Fe with steam to $Fe_3O_4$, treatment of the hot $Fe_3O_4$ with steam and chlorine to obtain oxygen, conversion of the mixture of iron oxides so obtained with hydrogen chloride to $FeCl_2$ and recycling of the $FeCl_2$ to the reduction stage, wherein a part of the heat required for the process is supplied by heating the hydrogen and steam in indirect heat exchange with a hot coolant from a high temperature nuclear reactor. The conversion of the iron oxides to $FeCl_2$ is carried out via the intermediate stage of dimeric $FeCl_3$ and it is thus possible to convey the solid reaction products by free fall through the reaction zones.

8 Claims, 2 Drawing Figures

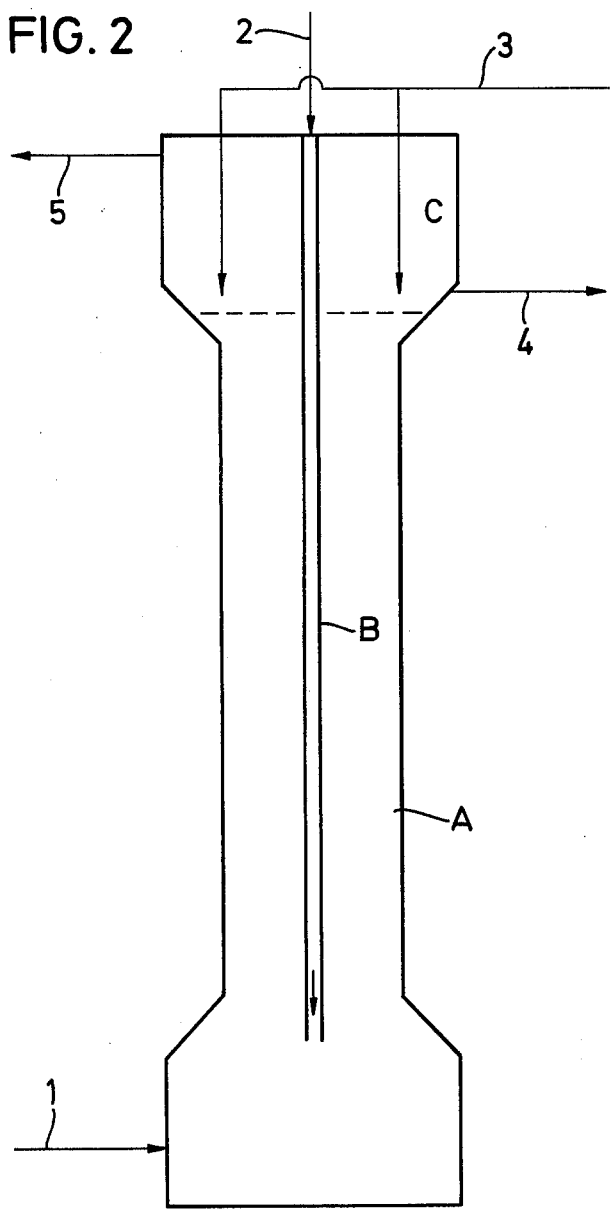

PRODUCING HYDROGEN AND OXYGEN BY DECOMPOSITION OF WATER VIA THE THERMOCHEMICAL IRON-CHLORINE SYSTEM

BACKGROUND OF THE INVENTION

In order to provide future energy requirements, various thermochemical processes have been developed in recent times by means of which water is decomposed into hydrogen and oxygen as hydrogen is an environmentally satisfactory energy supply. Such processes have in general been described as multi-stop processes in which in particular inorganic metal compounds, e.g. of iron, magnesium or vanadium as well as, for example, halogen or sulphur are employed as adjuvants. Efforts are being made to convey these adjuvants through the various reaction stages in a closed cycle, although this is obviously not essential. All these processes are relatively expensive however and offer considerable technical problems, so that up to now, no industrial-scale realisation has been undertaken.

SUMMARY OF THE INVENTION

It has now been found that hydrogen can be advantageously obtained with relatively simple technology by the decomposition of water in a thermochemical process, using inorganic iron compounds and chlorine or hydrogen chloride as auxiliary substances; the iron(II)-chloride, or if required, in admixture with iron(III)-chloride, is reduced to iron at temperatures above about 525° C in a first reaction zone using hydrogen; the iron is then heated in a second reaction zone by reaction with steam heated to above about 225° C so as to give iron(II/III)oxide, the heat energy of the effluent gas containing hydrogen being removed from the reaction zones and used for heating the hydrogen or water vapour introduced; the hydrogen is separated from the effluent gases of the two reaction zones and the part of the hydrogen not used for reducing the iron chloride is removed as the end product from the process. The heat of the iron(II/III)oxide thus obtained can then be used and by means of it in a further reaction oxygen can be obtained from water with chlorine together with hydrogen chloride. Then the hot iron oxide mixture evolved from this reaction is reacted at temperatures above about 525° C in the presence of chlorine and hydrogen chloride to give fluid dimeric iron(III)chloride, iron-(II)chloride which is then recycled to the first reaction zone being produced on condensation thereof.

DETAILED DESCRIPTION OF THE INVENTION

Figure 1:
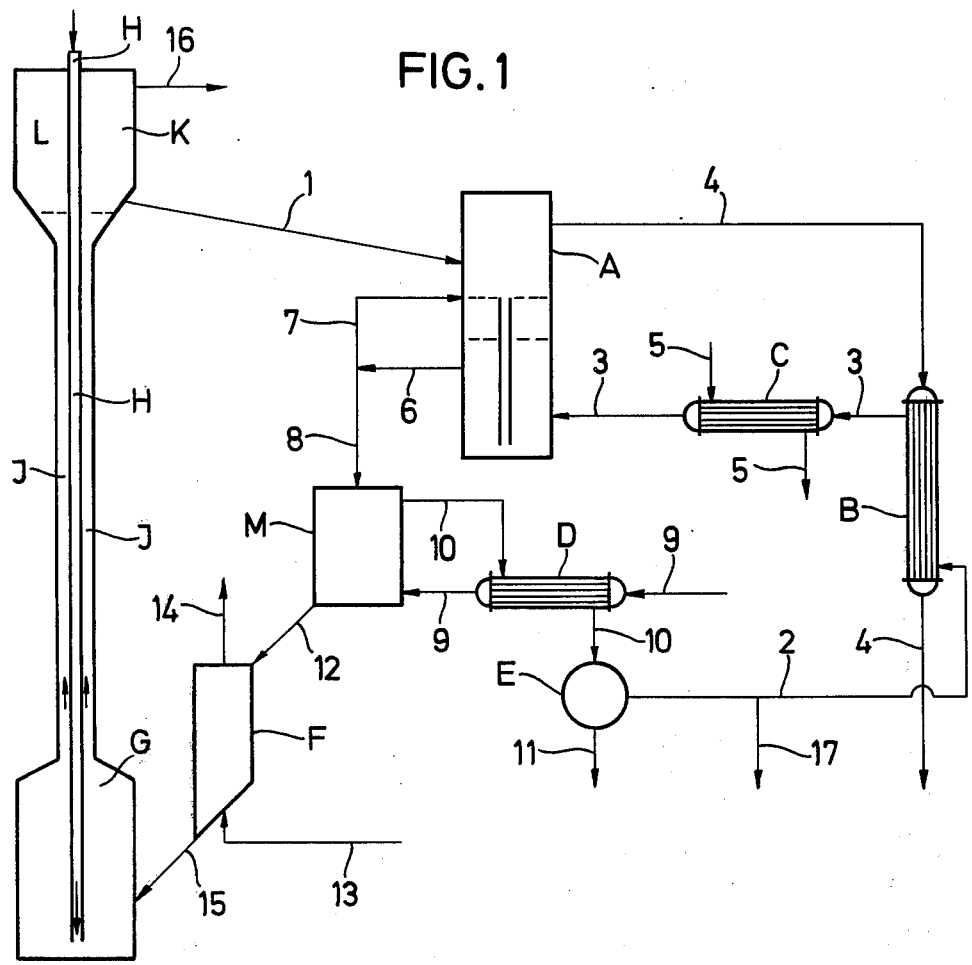

It is also possible to use, instead of chlorine or hydrogen, other halogens or their hydrides. The temperature in the first reaction zone is generally held at about 525° to 1300° C. The input ratio of iron(II)chloride and hydrogen can lie over very wide limits approximately between 1:2 and 1:20. The reduction can take place in stages so that between each stage heating of the reducing gas is preferably carried out. The hydrogen introduced is preferably preheated, e.g. to 725°–1100° C. This can take place for example in a first stage by means of the effluent gas containing hydrogen and hydrogen chloride leaving the reaction zone, whereas in a second stage the further heating to the desired end temperature can proceed with particular advantage by indirect heat exchange with the hot coolant, e.g. helium, of a high temperature nuclear reactor. Since in this case a heat exchange between gases is carried out, the apparatus can be kept relatively simple. The iron obtained, which is generally in very finely subdivided form, is supplied to the second reaction zone, for example by free falling under gravity. In this reaction zone, further superheated steam is introduced, so that at temperatures of 225° to 1300° C conversion of the iron to iron(II/III)oxide takes place. Heating of the steam can advantageously take place by indirect heat exchange with the hydrogen-containing effluent gases leaving the reaction zone. Obviously, it is possible to introduce at this point into the process heat derived from a nuclear reactor, which because of the two media, e.g. helium, as well as steam, can be carried out relatively simply. Heating of the water vapour is generally carried out to above about 225° C, e.g. 525° to 725° C. This reaction can also be carried out in steps if required. The product gas can be cooled with advantage between the stages by indirect heat exchange. The heat so obtained can otherwise be used in the method. From the effluent gases leaving the two reaction zones, the hydrogen is separated off in known manner. This can be done with particular advantage from both effluent gases in separate apparatus. To the extent that the hydrogen is not used for reducing the iron(II)chloride, it is removed from the process as the end product. The hydrogen chloride present in the effluent gases is preferably likewise separated off and recycled to the process. For separation, the effluent gas can be scrubbed with an aqueous hydrogen chloride solution for example, whereby reconcentration of the solution takes place. Obviously, all by-products obtained in any way can be recycled to the process.

The method steps for the conversion of chlorine and water with the production of oxygen as well as reformation of the iron(II)chloride likewise occur at high temperatures. For the first-mentioned reaction, the hot e.g. 1050° C iron(II/III)oxide is used as a heat carrier, which is preferably supplied to a third reaction zone under the influence of gravity. Then evolution of oxygen occurs at a temperature range of about 525° to 1300° C, wherein a part of the iron(II/III)oxide is oxidised to iron(III)oxide. This reaction can also be carried out in stages if required. It is advantageous to operate with a large steam excess in order to keep the chlorine content in the effluent gas as small as possible. The hydrogen chloride found in the effluent gas from this reaction zone is separated from the oxygen in the usual way. In general, oxygen can be obtained from the iron(II/III)oxide in known manner directly by conversion with chlorine, whereby iron(III)chloride is obtained as a by-product.

The recovery of iron(II)chloride can be carried out in various ways. According to a particularly advantageous method, the iron oxide mixture formed in the third reaction zone is treated at temperatures off about 550° to 800° C with chlorine and hydrogen chloride whereby fluid dimeric iron(III)chloride is formed. In the condensation of the vapours, iron(II)chlorine is formed which can by recycled to the first reaction zone, whereby the cycle is closed. In carrying out the method, in general an excess of hydrogen chloride is used, e.g. 2 to 3 times stoichiometric. By the addition of small amounts of chlorine to the conversion, e.g. in the case of iron(II/III)oxide, 4 to 8 vol %, it can be achieved that the possibly formed iron(II)chloride reacts immediately to iron(III)chloride. The conversion preferably proceeds in a fluidised bed at temperatures of 300° to 900° C. The rising mixture of iron(III)chloride vapours, hydrogen chloride, chlorine and steam is cooled in an upper zone of the reactor to a temperature below the melting point of iron(III)chloride when operating under normal pressure in the region of from about 100° to 300° C, e.g. at 290° C. Thereby, monomeric iron(III)chloride condenses in solid form and precipitates in the reactor. If required, steps can be taken by means of mobile devices, e.g. scrapers to ensure that the iron(III)chloride does not adhere to the reactor wall. Particularly if operation proceeds under elevated pressures, e.g. 10 to 100 atms is also readily possible to carry out the condensation of iron(III)chloride in such a way that it is produced in liquid form whereby the return or recycling and countercurrent system is facilitated.

The volatility of the dimeric iron(III)chloride can also be used to form a circuit for the iron compound so that in it no mechanical or pneumatic conveyance of solids is required, whereby a substantial simplification of the technology of the method is achieved. This can be achieved for example by providing evaporators in the lowest parts of the apparatus and conducting the vapours of dimeric iron(III)chloride in a current of heated chlorine and hydrogen chloride into a condenser which is arranged at the uppermost part of the apparatus. The rising vapours can be conducted in countercurrent to a chlorine and hydrogen chloride stream supplied from above, whereby at the high temperature of the iron oxide mix evaporation can be achieved without external heat supply.

The enthalpy of the vapours rising is sufficient to cause evolution of chlorine from the iron(III)chloride in the condenser.

The solid iron(II)chloride formed in the upper part of the reactor can be removed from the reactor in known manner, e.g. by way of a screw conveyor. Advantageously, an excess of hydrogen chloride is employed in the upper reactor zone in order to reduce the partial pressure of the chlorine and so facilitate evolution of the chlorine. The ratio of iron(III)chloride to hydrogen chloride can be varied over wide limits. The excess hydrogen chloride can be passed directly into the upper reactor zone, if required after preheating. It is possibly more advantageous however to introduce it e.g. via a dip pipe into the lower reactor zone the pipe extending into the reactor from above. The requisite chlorine can also be supplied in this way. On passing through the dip pipe, heating of the gases takes place by reason of the vapours evolved. Obviously it is also possible to supply the hydrogen chloride and the chlorine in any other ways to the reaction zones or to preheat them. In this way if required, the condensation temperature of the iron free chloride can be adjusted without additional cooling. It is also possible to supply the iron oxides or the chlorinating agent at such a temperature to the lower zone of the reactor that a further or external heat supply is not necessary. It can be of particular advantage that by reasons of the corresponding regulation of the stated temperatures, it is possible to carry out all reactions in the system without special heat supply, so that the entire system is operated adiabatically. The gas admixture of hydrogen chloride, chlorine and water leaving the reactor is separated in the conventional way. Hydrogen chloride and chlorine can be recycled to the reactor.

The iron(II)chloride obtained can be supplied under the action of gravity and under the corresponding chemical conversions through all subsequent reactor zones. Also, the iron(III)chloride obtained by direct conversion can be employed correspondingly. The separate method steps can be carried out at normal pressure, advantageously however under elevated pressures, e.g. 30 to 40 atms.

This advantage of supply of the products under the effect of gravity which particularly characterises the method according to the invention can also operate in other ways, e.g. it can be achieved by effecting the rising conveyance not by the fluid iron(III)chloride vapours but with the aid of the iron finely divided evolved in the first reaction space, which is supplied in a stream of hydrogen to the highest level of the apparatus. Then the various reaction spaces can be supplied by free falling. A further advantage of the method of the invention consists in that all reaction zones or a part of them, particularly the first three zones, can be combined together into one apparatus, wherein naturally by corresponding control devices, the satisfactory flow of the reaction component can be properly ensured. On the other hand, the separation of the gas circuits for reduction and the hydrogen production which is possible in accordance with the invention, is particularly advantageous. It allows a considerable simplification in the apparatus.

In the accompanying FIG. 1, one possibility for carrying out the method according to the invention has been illustrated by way of example diagrammatically.

In the reaction zone A which is held at a temperature of approximately 700° to 750° C, iron(II)chloride at a temperature of approximately 425° C is introduced via a line 1, whereas hydrogen at a temperature of approximately 1100° C is supplied by lines 2 and 3 after being heated in heat exchangers B and C. An effluent gas of hydrogen chloride and hydrogen (temperature approximately 625° C) leaves the reaction zone A via a line 4 and after giving up its heat in the heat exchanger B, is conducted to a separator plant, not shown. Hot helium derived from a high temperature nuclear reactor as coolant passes to the heat exchanger C via the lines 5 and causes heating of the hydrogen to the desired end temperature. The finely-divided iron obtained in the reactor zone A is passed together with hydrogen and chlorine via a line 6 at a temperature of about 725° C. After separation of the gases, which are recycled to reaction space via a line 7, the iron passes via a line 8 to the reactor zone M. Steam heated to about 750° C in the heat exchanger D is supplied to the zone M via a line 9, so that the formation of iron oxide can take place at about 1050° C. The effluent gas comprising hydrogen and steam from the reaction zone is passed via a line 10 to the heat exchanger D and serves to heat the incoming steam. It then passes to a separator apparatus E. The water is separated off here and removed via the line 11, whilst a part of the hydrogen is passed to the reaction zone A, in the way already described. The product hydrogen is taken off via a line 17. The iron oxide formed in the reaction zone M passes via a line 12 to an oxygen generator F in which a mixture of chlorine and water or steam is supplied via a line 13. The reaction temperature lies in the range from approximately 650°–1000° C. The effluent gas comprising hydrogen chloride and oxygen is taken off to a separator plant (not shown) via a line 14, whereas the hot iron oxides fall via the line 15 into the chlorination zone G. this is supplied with a hydrogen chloride-chlorine mixture via a dip pipe H. The formation of iron(III)chloride takes place in reaction zone G at about 650° C which is substantially in dimeric fluid form in admixture with hydrogen chloride and steam and passes via the pipe J to the upper reactor space K. Condensation of the iron(III)chloride vapours takes place in the zone L. A circulating and countercurrent system is thus established in K from which iron(II)chloride at a temperature of about 425° C is drawn off via the line 1 and is recycled to the reaction zone A. The effluent gas from the reaction zone K comprising hydrogen chloride, chlorine and steam is drawn off via a line 16 and supplied to a separator system (not shown). The components, hydrogen chloride, chlorine and water obtained from the effluent gases are recycled to the process.

Referring to FIG. 2, which shows diagrammatically one of the possible reaction schemes, the method illustrated for the conversion of iron oxides into iron(II)chloride is explained in more detail. In the lower zone of the reactor A, iron(II/III)oxide at a temperature of about 900°–980° C is supplied via the line 1. A mixture of 60 parts hydrogen chloride and 1 part chlorine is introduced from above into the zone via the line 2 and a dip pipe B, which has been preheated by the rising vapour gas mixture. Additionally, excess hydrogen chloride is supplied to the upper reactor zone via the lines 3. In the zone C, the dimeric iron(III)chloride is condensed. The iron(II)chloride thus formed is taken off via a line 4 at a temperature of approximately 290° to 320° C in practically quantitative yields, whereas the gas mixture of hydrogen chloride, chlorine and water leaves the reactor via a line 5 at a temperature of about 280° C.

We claim:

1. A method for obtaining hydrogen by decomposing water in a thermochemical process employing adjuvants selected from the group consisting of inorganic iron compounds, chlorine and hydrogen chloride comprising the steps of:
   a. reducing iron chloride selected from the group consisting of iron(II)chloride, iron(III)chloride and mixtures thereof at a temperature of about 525° to 1300° C in a first reaction zone with hydrogen to iron;
   b. supplying the iron to a second reaction zone and then converting it to $Fe_3O_4$ by reaction with steam heated to above 225° C, wherein the heat energy of the effluent gases containing hydrogen from the two reaction zones may be employed for heating reactants selected from the group consisting of hydrogen and steam in other reaction zones;
   c. separating the hydrogen, after the use of the heat, from the effluent gases of the two reaction zones and removing the part of the hydrogen not employed for the reduction of the iron chloride in the first reaction zone as an end product;
   d. withdrawing the hot $Fe_3O_4$ at approximately 900° to 1100° C from the second reaction zone and supplying it as a heat carrier to a third reaction zone in which it provides the heat required for the conversion carried out therein at a temperature range of about 225° to 1100° C of water and iron(II/III)oxide with chlorine accompanied by the evolution of oxygen;
   e. separating the oxygen from the cooled effluent gas from the third reaction zone and removing said oxygen as an end product;
   f. withdrawing the approximately 400° to 800° C hot mixture of iron oxides from the third reaction zone and supplying said mixture of iron oxides to a fourth reaction zone in which the iron oxides are converted with hydrogen chloride at 200° to 850° C to iron chloride selected from the group consisting of iron(II)chloride iron(III)chloride and mixtures thereof; and
   g. recycling said iron chloride from said fourth reaction zone to the first reaction zone.

2. The method of claim 1 wherein iron(II)chloride is prepared for recyling to the first reaction zone comprising the additional steps of:
   1. reacting the hot mixture of iron oxides leaving the third reaction zone at temperatures of about 525° to 850° C in the fourth reaction zone in the presence of chlorine and hydrogen chloride to produce vaporous dimeric iron(III)chloride;
   2. condensing the vaporous dimeric iron(III)chloride to form solid iron(II)chloride and monomeric iron(III)chloride; and
   3. withdrawing the solid iron(II)chloride and recycling it to the first reaction zone.

3. The method of claim 2, in which the hydrogen chloride required for the reaction as well as the chlorine supplied simultaneously are conducted from above into the fourth reactor zone.

4. The method of claim 2, in which an excess of hydrogen chloride is introduced into the fourth reaction zone.

5. The method of claim 2, in which the condensation of the dimeric iron(III)chloride vapours is carried out so that the monomeric iron(III)chloride is obtained in liquid form.

6. A method of claim 2, wherein the iron(II)chloride formed in the condensation passes through the following reaction zones under the influence of gravity by free fall while it is subjected to the corresponding chemical conversions.

7. The method of claim 1, in which the iron obtained by reduction in the first reaction zone is finely-divided and is conveyed in a stream of hydrogen into th second reaction zone, said second reaction zone being so arranged that the $Fe_3O_4$ formed therein passes to the following reaction zones under the influence of gravity by free fall and is there subjected to the corresponding chemical conversions.

8. The method of claim 1, in which the heating of reactants selected from the group consisting of hydrogen and steam being introduced into the third reaction zone is carried out at the requisite introduction temperature partly or wholly with the aid of hot nuclear reactor coolant.

* * * * *